(12) United States Patent
Krauß et al.

(10) Patent No.: US 11,713,143 B2
(45) Date of Patent: Aug. 1, 2023

(54) APPARATUS AND METHOD FOR PLACING MIXING BALLS INTO PHARMACEUTICAL CONTAINERS

(71) Applicant: Syntegon Technology GmbH, Waiblingen (DE)

(72) Inventors: Ulrich Krauß, Ilshofen (DE); Steffen Humpfer, Satteldorf (DE); Reiner Staeudle, Rot am See (DE); Reinhold Schmieg, Wallhausen (DE)

(73) Assignee: Syntegon Technology GmbH, Waiblingen (DE)

( * ) Notice: Subject to any disclaimer, the term of this patent is extended or adjusted under 35 U.S.C. 154(b) by 114 days.

(21) Appl. No.: 17/429,509

(22) PCT Filed: Feb. 14, 2020

(86) PCT No.: PCT/EP2020/053828
§ 371 (c)(1),
(2) Date: Aug. 9, 2021

(87) PCT Pub. No.: WO2020/165380
PCT Pub. Date: Aug. 20, 2020

(65) Prior Publication Data
US 2022/0089304 A1    Mar. 24, 2022

(30) Foreign Application Priority Data

Feb. 14, 2019  (DE) ..................... 10 2019 201 950.1

(51) Int. Cl.
*B65B 3/00* (2006.01)
*B65B 35/06* (2006.01)
(Continued)

(52) U.S. Cl.
CPC .............. *B65B 3/003* (2013.01); *B65B 35/06* (2013.01); *B65B 43/54* (2013.01); *G01N 35/1065* (2013.01); *G01N 2035/00574* (2013.01)

(58) Field of Classification Search
CPC ......... B65B 3/003; B65B 35/06; B65B 43/42; B65B 43/54; B65G 47/02; B65G 47/12
See application file for complete search history.

(56) References Cited

U.S. PATENT DOCUMENTS 9,878,813 B2 * 1/2018 Eberhardt ............... B65B 3/003
10,669,049 B2 * 6/2020 Eberhardt ............. B65B 65/003
(Continued)

FOREIGN PATENT DOCUMENTS

CN   102431947 A   5/2012
CN   102470072 A   5/2012
(Continued)

OTHER PUBLICATIONS

Translation of International Search Report for Application No. PCT/EP2020/053828 dated Apr. 21, 2020 (2 pages).
(Continued)

*Primary Examiner* — Timothy L Maust
(74) *Attorney, Agent, or Firm* — Michael Best & Friedrich LLP

(57) ABSTRACT

The invention relates to an apparatus (10) for placing mixing balls (1) into pharmaceutical containers (2), comprising a transport device (30) for conveying, preferably intermittently, the containers (2), and comprising a feed device (45) for the mixing balls (1), wherein the feed device (45) can be moved between a position for removing mixing balls (1) from a storage means (46) and a position for transferring the mixing balls (1) into the containers (2).

11 Claims, 4 Drawing Sheets

(51) Int. Cl.
   *B65B 43/54* (2006.01)
   *G01N 35/10* (2006.01)
   *G01N 35/00* (2006.01)

(56) References Cited

U.S. PATENT DOCUMENTS

2015/0122693 A1  5/2015  Deutschle et al.
2022/0089304 A1* 3/2022  Krauß ................ G01N 35/1065

FOREIGN PATENT DOCUMENTS

| CN | 102470933 A | 5/2012 |
| CN | 104272049 A | 1/2015 |
| DE | 20216300 U | 3/2004 |
| DE | 102005026986 A1 | 12/2006 |
| DE | 102006024072 A1 | 11/2007 |
| DE | 102009046662 A1 | 5/2011 |
| DE | 102014214697 A1 | 1/2016 |
| DE | 202017103606 U1 | 8/2018 |
| EP | 2394915 A1 | 12/2011 |
| WO | 2012121365 A1 | 9/2012 |

OTHER PUBLICATIONS

English translation of Written Opinion of the International Searching Authority for Application No. PCT/EP2020/053828 dated Apr. 21, 2020 (4 pages).

Chinese Patent Office First Office Action for Application No. 202080014481.5 dated Jun. 2, 2022 (15 pages including English translation).

* cited by examiner

APPARATUS AND METHOD FOR PLACING MIXING BALLS INTO PHARMACEUTICAL CONTAINERS

BACKGROUND

The invention relates to an apparatus and a method for placing mixing balls into pharmaceutical containers. Mixing balls of this type, made of metal or glass, are used to loosen or evenly distribute substances deposited on the bottom of the container before pharmaceuticals are removed from the container by shaking the container. The apparatus is in particular part of a filling system for filling and closing the pharmaceutical containers with the pharmaceuticals.

An apparatus is known from DE 10 2006 024 072 A1, by the applicant. The known apparatus comprises a transport device in which the pharmaceutical containers are arranged in receptacles or cells of the transport device at regular intervals in the form of a row. During their intermittent conveyance, the containers reach the region of a feed device for the mixing balls, which feed device, in accordance with the arrangement of the containers in the receptacles of the transport device, has a large number of vacuum needles which operate by means of negative pressure and which, in a pick-up position, each remove a mixing ball from a storage means for the mixing balls and, in a position for transferring aligned with the openings of the containers, deliver or place the respective mixing balls into the containers. It is essential in this case that the pharmaceutical containers first have to be introduced into the individual receptacles of the transport device by means of suitable devices, which requires an outlay in terms of device technology.

It is also known from DE 202 16 300 U1, by the applicant, to supply pharmaceutical containers to the filling system in stackable trays, which are used as transport containers. The transport containers are used to transport the containers from the manufacturer of the containers to the filler or the filling system. In the region of the filling system, the pharmaceutical containers are unstacked by means of a handling robot or the like and introduced into the receptacles of the transport device from the receptacles of the tray.

SUMMARY

The apparatus for placing mixing balls into pharmaceutical containers according to one embodiment has the advantage that it allows simplified handling in comparison with the prior art. In particular, in contrast to the prior art, it is not necessary to remove the containers from the transport container or to arrange them in receptacles of a transport device before the mixing balls are placed into the containers. For this purpose, the teaching of the invention suggests that the transport device is designed to transport transport containers (for the pharmaceutical containers), a receiving element for receiving a plurality of pharmaceutical containers being provided in each of the transport containers, and a centering device being provided for the receiving element, which centering device aligns the containers arranged in the receiving element with respect to the feed device for the mixing balls in the position for transferring the mixing balls into the pharmaceutical containers.

In other words, this means that, in order to place the mixing balls into the pharmaceutical containers, it is only necessary to align the openings of the pharmaceutical containers that are located in the receptacles of the transport container or in the receiving element with respect to the feed device for the mixing balls. This includes, in particular, an arrangement or positioning of the containers in such a way that the openings of the pharmaceutical containers, via which mixing balls are placed into the pharmaceutical containers, are aligned in the vertical direction, such that the mixing balls can be placed into the containers by means of gravity. Such an apparatus makes it possible, in particular in the context of a filling system, to also be able to fill the containers with the pharmaceuticals, in particular subsequently, in a state of the containers in which the containers are arranged in the receptacles of the receiving element or in the transport container.

Since, as already mentioned, it is important for the alignment of the containers or the openings of the containers with respect to the feed device for the mixing balls that the receptacles of the receiving element are aligned as precisely as possible with respect to the feed device, a preferred structural embodiment of the apparatus provides that the centering device has at least one centering element for aligning the receiving element that interacts with a counter element of the receiving element in a form-fitting manner. At least one, preferably at least two, centering pins or the like are envisaged here, which are, for example, conical in the longitudinal direction and which can enter into (round) recesses or openings in the receiving element in order to allow centering or positioning of the receiving element relative to the centering pins (which have a defined position relative to the feed device).

In order to make the highest possible performance of the apparatus possible with a relatively simple structural design, in a preferred variant of the device, the receiving element has a plurality of rows which are arranged in parallel with one another and have receptacles for the pharmaceutical containers, and the feed device, for each pharmaceutical container in a row, has a feed element for feeding a mixing ball, the feed elements being arranged on a common carrier element.

In order to make a movement of the feed device between the position for removing the mixing balls from the storage means and the position for transferring the mixing balls into the openings of the pharmaceutical containers possible, in a further development of the last-mentioned structural proposal, the carrier element is arranged so as to be pivotable about a vertical axis and movable in a reciprocating manner in the direction of the vertical axis.

Such an arrangement of the carrier element in particular also makes it possible to arrange the essential components of the feed device laterally next to the transport device or the pharmaceutical containers, which, for example, simplifies a laminar flow in the region of the openings of the pharmaceutical containers in order to keep the containers sterile. For this purpose, it is provided that the carrier element can be adjusted into a position located laterally to the conveying path of the transport device in order to pick up mixing balls, the storage means being arranged next to the conveying path for the transport containers.

In order to ensure that no mixing balls are lost during the movement of the feed device between the position for picking up the mixing balls and the position for transferring the mixing balls, or that the mixing balls have actually been placed into the containers, a control device for at least indirectly detecting the delivery of mixing balls into the pharmaceutical containers is preferably assigned to the feed device for the mixing balls. Such a control device can be designed, for example, in the form of an optical device which detects the movement of a mixing ball in the direction of the opening of a container or the presence of a mixing ball by means of a light barrier or the like. Camera systems or the like, for example, which detect the mixing balls in the region of the feed device or the pharmaceutical containers are also conceivable.

The invention also relates to a method for placing mixing balls into pharmaceutical containers, the method in particular comprising an apparatus which is designed in the manner according to the invention that is described above. The method according to the invention is characterized in that the mixing balls are placed into pharmaceutical containers arranged in a transport container. Such a method simplifies handling in comparison with the prior art in that the containers do not have to be removed from the transport container or from the receiving element for the pharmaceutical containers in the transport container.

In a further development of the method according to the invention, the containers are filled after the mixing balls have been placed into containers arranged in the transport container. In other words, this means that the apparatus for placing the mixing balls into the containers is arranged as one of the first stations of a filling system for the pharmaceutical containers.

Further advantages, features and details of the invention can be found in the following description of preferred embodiments and with reference to the drawings.

DETAILED DESCRIPTION

Figure 1:
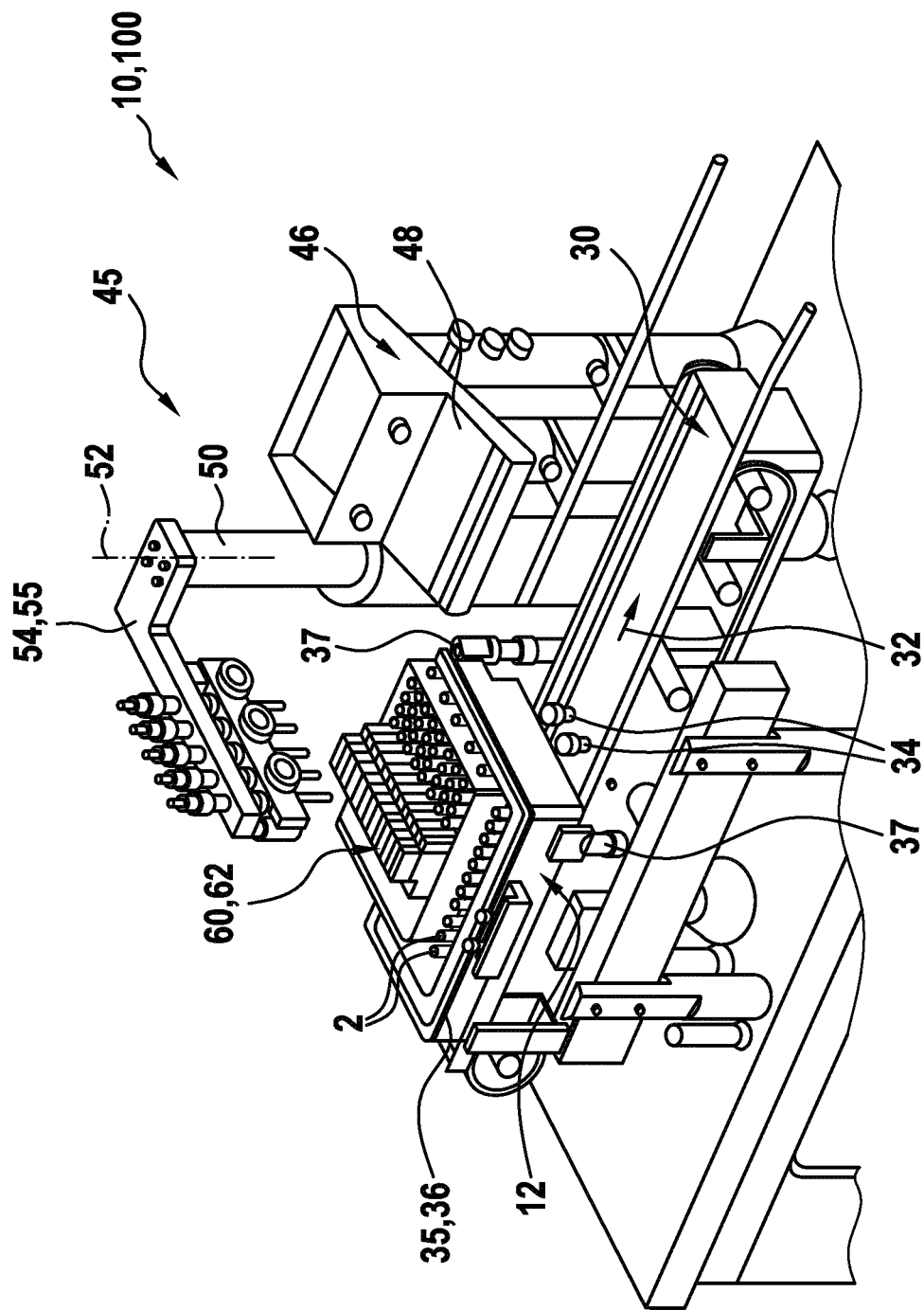
FIG. 1 is a perspective view of an apparatus for placing mixing balls into pharmaceutical containers.

Identical or similar elements are provided with the same reference signs in the drawings.

FIG. 1 shows an apparatus 10 for placing mixing balls 1 (FIG. 4) into pharmaceutical containers 2. The pharmaceutical containers 2 are in particular cylindrical ampoules, vials or the like, which are tubular and which are closed at one axial end region thereof by a crimping cap 3 or the like, through which a liquid or suspension (pharmaceuticals) present in the container 2 can be removed by piercing with a needle (not shown). The other axial end of the container 2 is initially open with an opening 4 which is also closed after the containers 2 have been filled.

The apparatus 10 is in particular part of a filling system 100 for filling and closing the containers 2, the apparatus 10 being provided as the first or one of the first stations of the filling system 100, such that the containers 2, after passing through the apparatus 10, are then filled and sealed in the region of the filling system 100.

Figure 4:
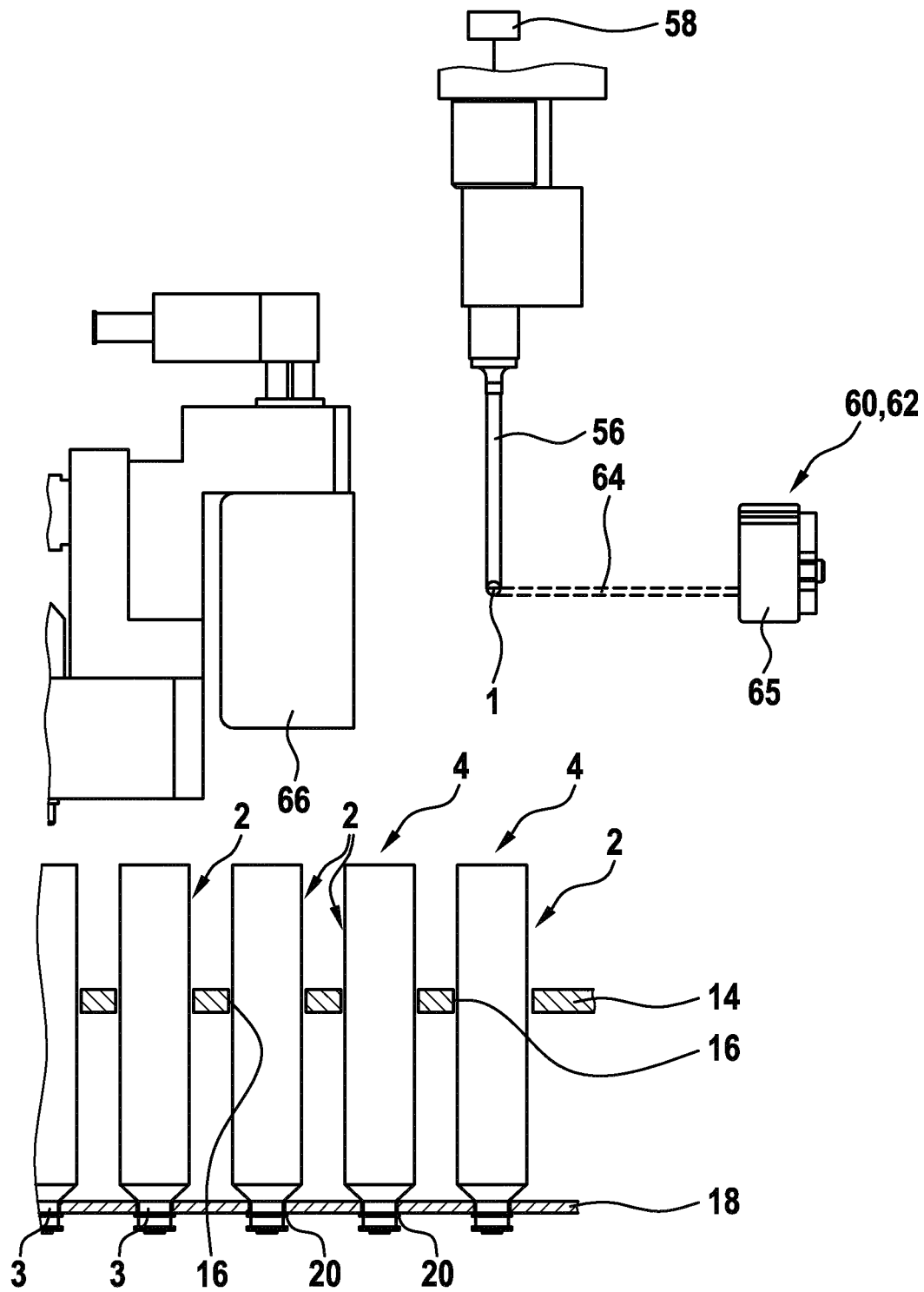
FIG. 4 is a longitudinal section through the apparatus according to FIG. 3, to explain the mode of operation of a control device.

The containers 2 delivered by a packager or manufacturer of the containers 2 to the filling system 100 or the apparatus 10 are arranged within a trough-shaped transport container 12. The interior of the transport container 12 comprises a receiving element 14 in the form of a bottom insert or the like, which, in accordance with the number of containers 2, has a plurality of receptacles 16 in the form of through-openings or openings, by means of which the containers 2 are received or positioned in a form-fitting manner. As shown in FIG. 4, for example, a bottom plate 18 having receptacles 20 is provided in the bottom region of the transport container 12, which receptacles are located in the region of the tapering axial end portion of the containers 2, such that the bottom plate 18 forms an axial end stop for the containers 2.

Figure 2:
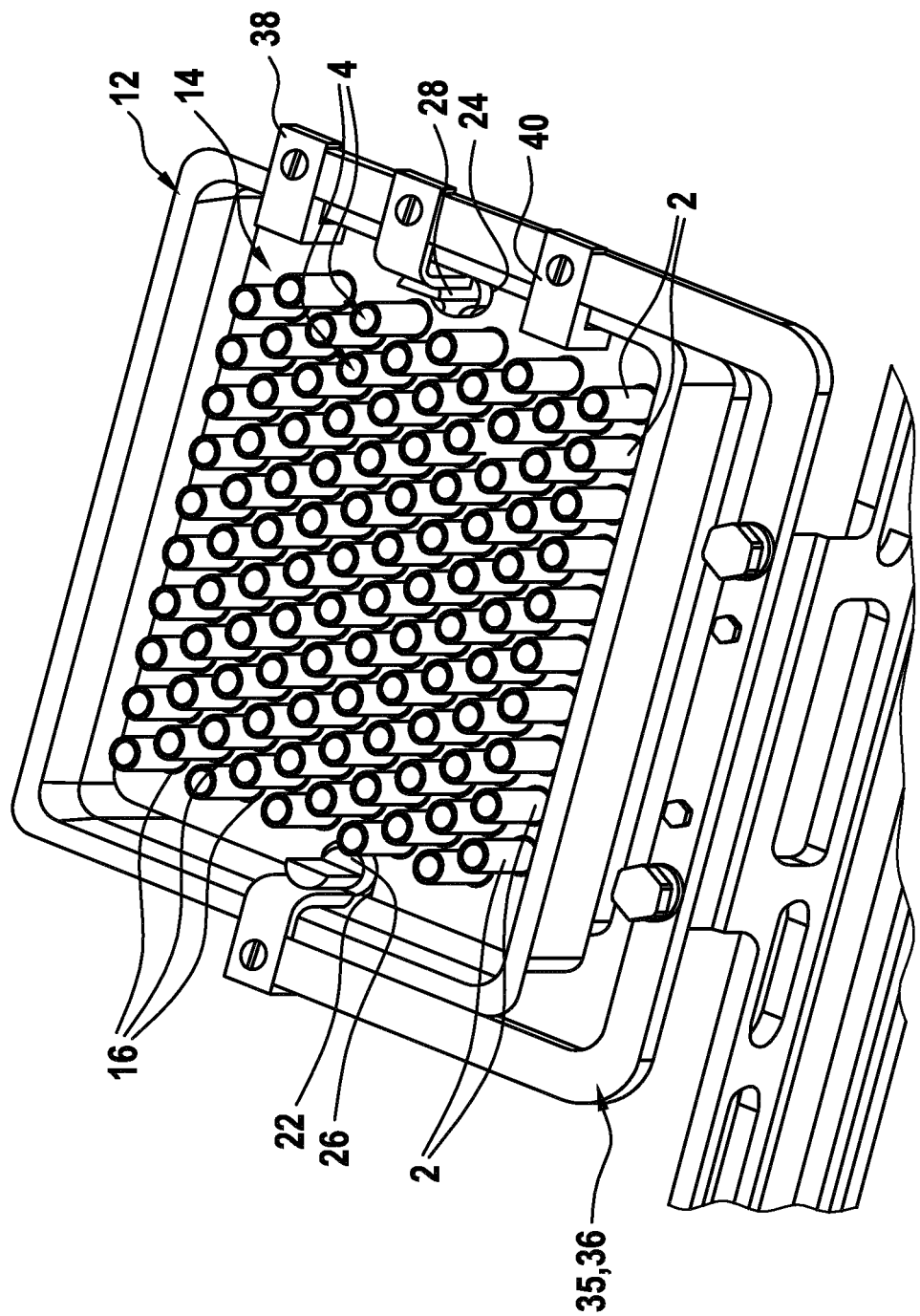
FIG. 2 is a perspective view of a transport container in the region of the apparatus according to FIG. 1.

The containers 2 are arranged upright inside the transport container 12 such that the longitudinal axes of the containers 2 are oriented vertically and the openings 4 of the containers 2 (when the transport container 12 is open) are accessible from the top of the transport container 12. Furthermore, as shown in FIG. 2, the receiving element 14, which has an approximately rectangular outer shape, in particular has a groove-shaped recess 22, 24, for example, in each case at two opposite edge regions, which groove-shaped recess is designed to interact in a form-fitting manner with a counter element formed in the manner of a centering pin or a centering element 26, 28 in each case, as will be explained in more detail below.

The apparatus 10 has a transport device 30 in the form of a conveyor belt or the like, on the upper face of which the transport containers 12 are conveyed along in a conveying direction 32. In the region of the transport device 30, said apparatus also has lifting rams 34, which can be seen in FIG. 1, which are arranged so as to be vertically adjustable and which are used to stop the conveying movement of the transport container 12 on the transport device 30. A lifting device (shown only in FIG. 1) is also provided that has further lifting rams 37 in the corner regions of the transport container 12, which lifting rams lift the transport container 12 after it has been stopped or release it from the transport device 30. Furthermore, as shown in FIGS. 1 and 2, the apparatus 10 has a positioning fork 36 which can be adjusted incrementally in the conveying direction 32 as part of a centering device 35, on which the two counter elements 26, 28 are arranged or fastened. Two further positioning elements 38, 40, which are arranged on the positioning fork 36, are used to position or hold the transport container 12. When the lifting device moves the lifting rams 37 for the transport container 12 from a lowered position into the raised position thereof, the transport container 12 is released or raised by the transport device 30. In this case, the counter elements 26, 28 of the positioning fork 36 come into operative connection or form-fitting contact with the recesses 22, 24 of the receiving element 14, such that the receiving element 14, and thus also the containers 2, are positioned or aligned with respect to a feed device 45 of the apparatus 10. In particular, it can be seen from FIG. 2 that the containers 2 are arranged within the receiving element 14 or the receptacles 16 in rows in a direction extending transversely or perpendicularly to the conveying direction 32, the rows in the embodiment each being arranged so as to be laterally offset from one another.

The apparatus 10 further comprises the aforementioned feed device 45 for the mixing balls 1. The feed device 45, laterally next to the transport device 30, has a ball storage means 46 having a pick-up region 48 for the mixing balls 1.

Laterally next to the ball storage means 46 is a column 50 having a pivot arm 54 as a carrier element 55, which pivot arm is mounted so as to be movable in a reciprocating manner and rotatable about a pivot axis 52. Vacuum needles 56 are arranged as feed elements on the pivot arm 54 or the carrier element 55 in accordance with the distance between the openings 4 of the containers 2 that is formed perpendicularly to the conveying direction 32, which vacuum needles are designed to each pick up a mixing ball 1 from the transfer region 48 of the ball storage means 46 in a pick-up position and to place the corresponding mixing balls 1 into the containers 2 in a position for transferring in which the vacuum needles 56 are aligned with the openings 4 of the containers 2. For this purpose, the vacuum needles 56 are each arranged in operative connection with a negative pressure source 58 which is common in the embodiment, it being possible for a negative pressure to be applied or switched off at the vacuum needles 56, for example by means of suitable valve devices or the like. This makes it possible, in the pick-up position in the pick-up region 48, to suck a mixing ball 1 onto the vacuum needle 56 in each case by applying the negative pressure and, in the position for transferring, to place the mixing ball 1 into the container 2 as a result of gravity by switching off the negative pressure.

Figure 3:
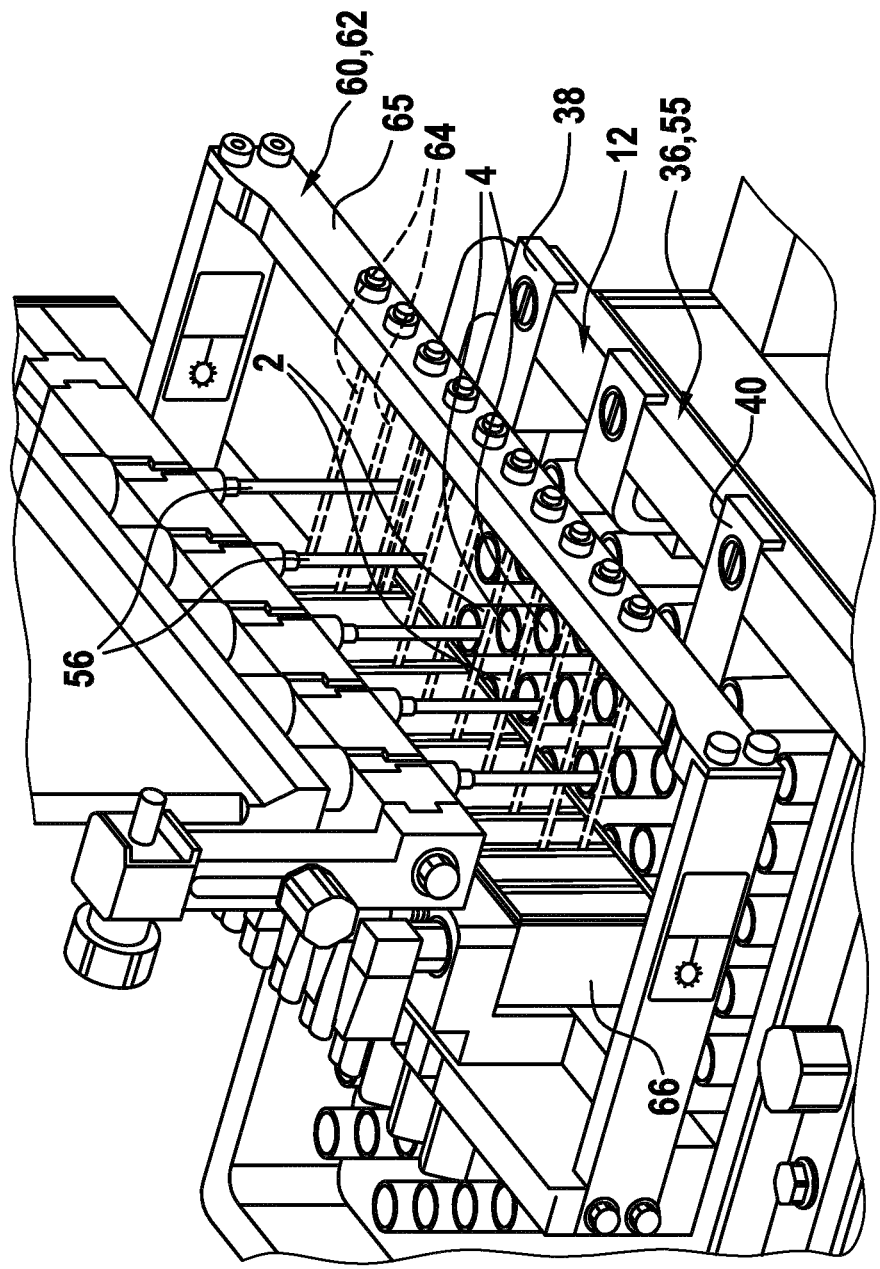
FIG. 3 is a perspective view of the apparatus according to FIG. 1 during operation.

In order to ensure that a mixing ball 1 is arranged on each vacuum needle 56 or that the mixing ball 1 is placed into the container 2, a control device 60 is also provided, as shown in FIGS. 3 and 4. The control device 60 is designed in the form of an optical device 62 and, for example, in each case comprises a light beam 64 which is emitted by a transmitting element 65 and is received by a receiving element 66, such that the device 62 operates in the manner of a light barrier. If, as shown in FIG. 4, a mixing ball 1 is located in the region of the light beam 64 in a defined vertical position of the vacuum needle 56, the light beam 64 is interrupted, such that the presence of a mixing ball 1 can be inferred. In order to place the mixing balls 1 into the containers 2, the vacuum needles 56 can then be lowered further into the containers 2.

In order to place the mixing balls 1 into the containers 2, mixing balls 1 are removed from the transfer region 48 by the vacuum needles 56 for each row of containers 2 and, after the carrier element 55 is subsequently raised, pivoted and lowered, are aligned with the openings 4 of the containers 2. By switching off the negative pressure when the vacuum needles 56 are immersed in the containers 2, the mixing balls 1 detach from the vacuum needles 56 and enter the containers 2 by means of gravity. The lowered position of the vacuum needles 56 prevents the mixing balls from jumping out of the relevant container 2 even if the mixing balls 1 jump back after the impact. The positioning fork 36 is then moved further in the conveying direction 32, for example by the distance between the rows between the containers 2, such that the processes described are repeated for placing the next mixing balls 1. As soon as all the containers 2 are filled with the corresponding number of mixing balls 1, the transport container 12 with the pharmaceutical containers 2 is conveyed further by the transport device 30 and is preferably fed to a filling device with the containers 2 still located within the transport container 12.

The apparatus 10 described above can be altered or modified in many different ways without deviating from the inventive concept. For example, a conveying unit for the transport container 12, which moves said transport container incrementally transversely to the conveying direction 32 after it has been released from the transport device 30, makes greater flexibility possible with regard to the containers 2 in the transport container 12, since the vacuum needles 56 can then assume any positions in the region of the transport container 12.

The invention claimed is:

1. An apparatus (10) for placing mixing balls (1) into pharmaceutical containers (2), the apparatus (10) comprising a transport device (30) for conveying the containers (2) and comprising a feed device (45) for the mixing balls (1), the feed device (45) being movable between a position for removing mixing balls (1) from a storage means (46) and a position for transferring the mixing balls (1) into the containers (2), wherein
the transport device (30) is designed to transport transport containers (12), a receiving element (14) for receiving a plurality of containers (2) being provided in each of the transport containers (12), and a centering device (35) being provided for interaction with the receiving element (14), which centering device aligns the containers (2) arranged in the receiving element (14) with respect to the feed device (45) in the position for transferring.

2. The apparatus according to claim 1,
wherein
the centering device (35) has at least one centering element (26, 28) for aligning the receiving element (14), which centering element interacts with a counter element (22, 24) of the receiving element (14) in a form-fitting manner.

3. The apparatus according to claim 2,
wherein
the centering device (35) for aligning the receiving element (14) interacts with a lifting device having a lifting ram (37), which lifting device is designed to lift the transport container (12) from the transport device (30) and release the transport container (12).

4. The apparatus according to claim 1,
wherein
the receiving element (14) has a plurality of rows which are arranged in parallel with one another and have receptacles (16) for the containers (2), and wherein the feed device (45) includes a plurality of feed elements (56) arranged on a common carrier element (55), such that each container (2) in a row has associated therewith a feed element (56) of the plurality of feed elements (56) for feeding a mixing ball (1).

5. The apparatus according to claim 4,
wherein
the carrier element (55) is arranged so as to be pivotable about a vertically arranged axis (52) and movable in a reciprocating manner in a direction of the vertical axis (52).

6. The apparatus according to claim 4,
wherein
the carrier element (55) can be adjusted into a position located laterally to the transport device (30) in order to pick up mixing balls (1), the storage means (46) being arranged laterally next to the transport device (30).

7. The apparatus according to claim 1,
wherein
a control device (60) for at least indirectly detecting delivery of mixing balls (1) into the containers (2) is assigned to the feed device (45).

8. The apparatus according to claim 7,
wherein
the control device (60) is an optical device (62).

9. A method for placing mixing balls (1) into pharmaceutical containers (2) by an apparatus (10) which is designed according to claim 1
wherein
the mixing balls (1) are placed into containers (2) arranged in a transport container (12).

10. The method according to claim 9,
wherein
the containers (2) are filled after the mixing balls (1) have been placed into containers (2) arranged in the transport container (12).

11. The apparatus according to claim 1, wherein the transport device (30) conveys the containers (2) intermittently.

* * * * *